US005249640A

United States Patent [19]

Grove

[11] Patent Number: 5,249,640

[45] Date of Patent: Oct. 5, 1993

[54] ROCKING PLATFORM FOR WHEEL CHAIR

[76] Inventor: Clinton E. Grove, R.R. 2, Elbow Lake, Minn. 56531

[21] Appl. No.: 911,568

[22] Filed: Jul. 9, 1992

[51] Int. Cl.[5] .................... B62B 9/22

[52] U.S. Cl. .................... 180/166; 5/109; 128/24 R

[58] Field of Search .................... 280/250.1, 304.1; 180/166; 297/DIG. 4; 5/108, 109; 128/24 R, 24.1, 25 R, 24.2

[56] References Cited

U.S. PATENT DOCUMENTS

| | | | |
|---|---|---|---|
| 404,767 | 6/1889 | Botkin . | |
| 745,334 | 12/1903 | Dutton . | |
| 1,743,904 | 1/1930 | Russell . | |
| 2,632,517 | 3/1953 | Fraunfelder et al. . | |
| 3,351,051 | 11/1967 | Jennings | 128/24 |
| 3,403,905 | 10/1968 | Hamilton . | |
| 3,653,080 | 4/1972 | Hafele | 5/108 |
| 4,118,046 | 10/1978 | Vaughan | 280/304.1 |
| 4,194,499 | 3/1980 | Donnelly | 128/24.1 |
| 4,256,095 | 3/1981 | Graham | 128/24.1 |
| 4,324,414 | 4/1982 | Wilkes | 280/250.1 |
| 4,527,944 | 7/1985 | Qually et al. | 414/678 |
| 4,592,695 | 6/1986 | McConnell | 414/678 |
| 4,768,497 | 9/1988 | Winge | 297/DIG. 4 |

*Primary Examiner*—Richard M. Camby
*Attorney, Agent, or Firm*—Dorsey & Whitney

[57] ABSTRACT

An apparatus for supporting and rocking a wheel chair has a support platform with at least one wheel-securing opening. There is a first ramp leading to the support platform and a filler platform adapted to fit in the wheel-securing opening. The apparatus also has a lifting mechanism for moving the support platform and filler platform relative to each other so that the support platform moves between a rocking position above the filler platform and a lowered, loading position in which the filler platform fits in the wheel-securing opening.

15 Claims, 5 Drawing Sheets

ROCKING PLATFORM FOR WHEEL CHAIR

TECHNICAL FIELD

This invention relates to a device for rocking a wheel chair and, more particularly, to a device for supporting and lifting a wheel chair and rocking the wheel chair in the lifted position.

BACKGROUND ART

Invalids and others confined to wheel chairs have a certain amount of horizontal mobility on surfaces where wheels can roll. However, such persons may desire rocking motion in the manner of a rocking chair. The desire to rock may arise from a wish to relieve the monotony of sitting in a wheel chair. It may also arise from the desire of a wheel chair-confined person to rock a baby she/he is holding. In addition, there is some medical evidence that rocking persons confined to wheel chairs can be beneficial in terms of increased blood circulation, stress relief, respiratory assistance and other advantageous physical effects. Unfortunately, a standard wheel chair does not permit such rocking motion.

Transferring a wheel chair-confined person to and from a conventional rocking chair is a difficult and potentially harmful process. Moreover, for some patients, who have no strong assistance, such a transfer is simply not possible. It is therefore preferable to find a way to deliver rocking motion to the wheel chair itself.

Prior art devices for permitting wheel chairs to rock appear to be of two general types. There are wheel chairs that are specially adapted to provide rocking motion as well as normal rolling motion. Examples of such devices are shown in U.S. Pat. Nos. 404,767, 745,334 and 4,324,414. There are also rocking adapters that are made for use with standard wheel chairs. Examples of such devices are shown in U.S. Pat. Nos. 4,118,046, 4,768,497 and in a brochure titled, "The Original Carolina Rocker," by Artec, Inc. of Greenville, S.C. 29616.

A wheel chair that is specially adapted to provide rocking motion as well as normal rolling motion has the disadvantage that the rocking facility can only be used by the one person using that wheel chair. Rocking adapters that are made for interchangeable use with standard wheel chairs solve the preceding problem and can, at least in principle, be used by multiple persons, each in turn. But such adapters may be difficult to access by a wheel chair-confined person acting alone and may lack safe, stable holding of the wheel chair during rocking. They may also be difficult to transport, limiting their ability to be used by multiple persons, or may require the wheel chair occupant to provide the rocking motion.

A device for supporting and rocking a wheel chair that solves the preceding problems would be a useful advance over the prior art.

SUMMARY OF THE INVENTION

An apparatus for supporting and rocking a wheelchair has a support platform with at least one wheel-securing opening. There is a first ramp leading to the support platform and a filler platform adapted to fit in the wheel-securing opening. The apparatus also has means for moving the support platform and filler platform relative to each other so that the support platform moves between a rocking position above the filler platform and a lowered, loading position in which the filler platform fits in the wheel-securing opening.

It is an object of the present invention to provide a wheel chair rocking platform with easy access and secure holding of a standard wheel chair.

It is another object of the present invention to provide a wheel chair rocking platform that is raised only a small distance above the floor.

It is a further object to provide a wheel chair rocking device that has a gradual start for rocking motion and an adjustable rocking speed control.

It is still another object of the present invention to provide a wheel chair rocking platform that is relatively easily transported.

These and other objects of the present invention will become clearer in the description of the preferred embodiment below and the figures referenced therein.

DETAILED DESCRIPTION OF THE PREFERRED EMBODIMENT

Figure 1:
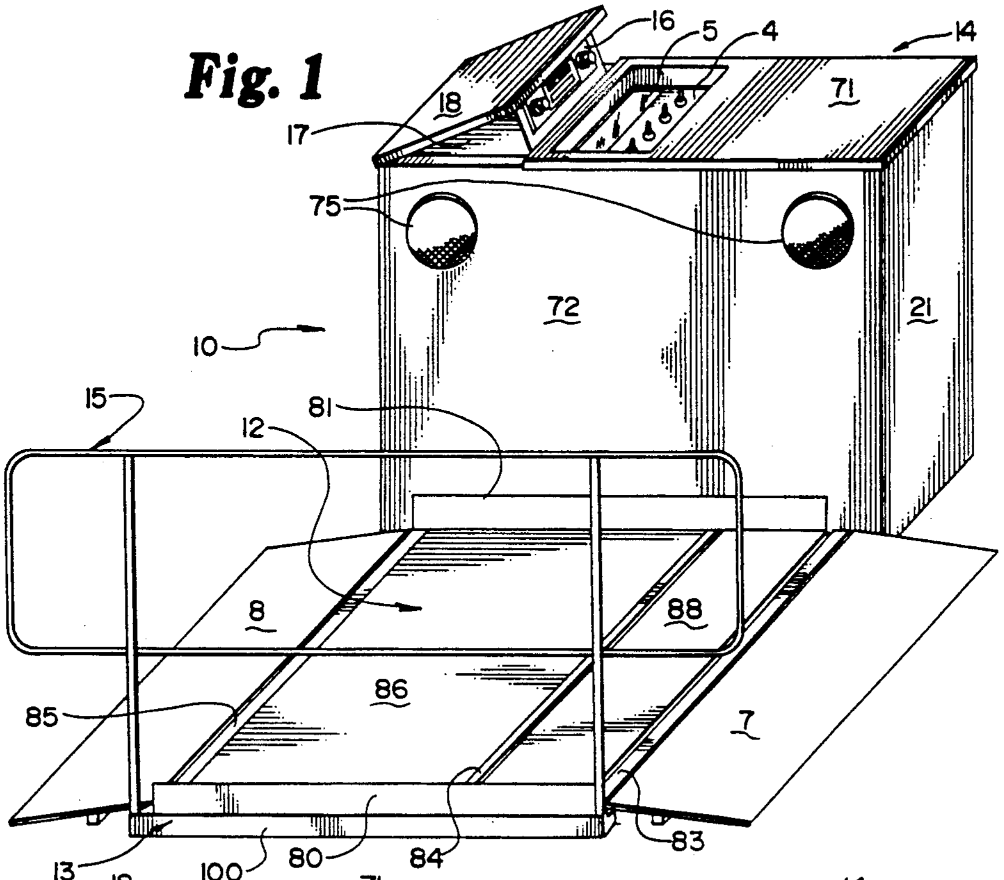
FIG. 1 is a perspective view of the present invention.

FIG. 1 shows a perspective view of the wheel chair rocker 10 of the present invention, including the following major components and assemblies: rocking platform assembly 12, base frame 13, actuator console 14, entrance ramp 7 and exit ramp 8. Also visible in FIG. 1 are a safety rail 15 attached to the base frame 13, to aid ramp access and help prevent tripping over the base frame 13; a retractable entertainment module 16, with a pair of speakers 75, 75; a control panel 4 for actuator control; and a control display 5.

Referring now also to FIGS. 2 through 6 (in which all or portions of the outer panels of actuator console 14 have been removed for clarity), it can be seen that the base frame 13 and actuator console 14 rest on floor 65. The rocking platform assembly 12 is formed by two parallel, horizontal main rails 80, 81, between which are connected a pair of parallel wheel holding frame members 83, 84 (adjacent entrance ramp 7) and a front connection member 85 (adjacent exit ramp 8). The area between wheel holding frame member 84 (spaced from entrance ramp 7) and the front connection member 85 is occupied by support panel 86, which is connected to rails 80, 81 and members 84, 85 by suitable fasteners. As will be described in greater detail below, the area between the wheel holding frame members 83, 84 contains no connected panel. However, a filler panel 88 fits within the area defined by the wheel holding frame members 83, 84 and the rails 80, 81 and is in substantially the same plane as the support panel 86, when the rocking platform 12 is in a lowered, loading position.

Figure 2:
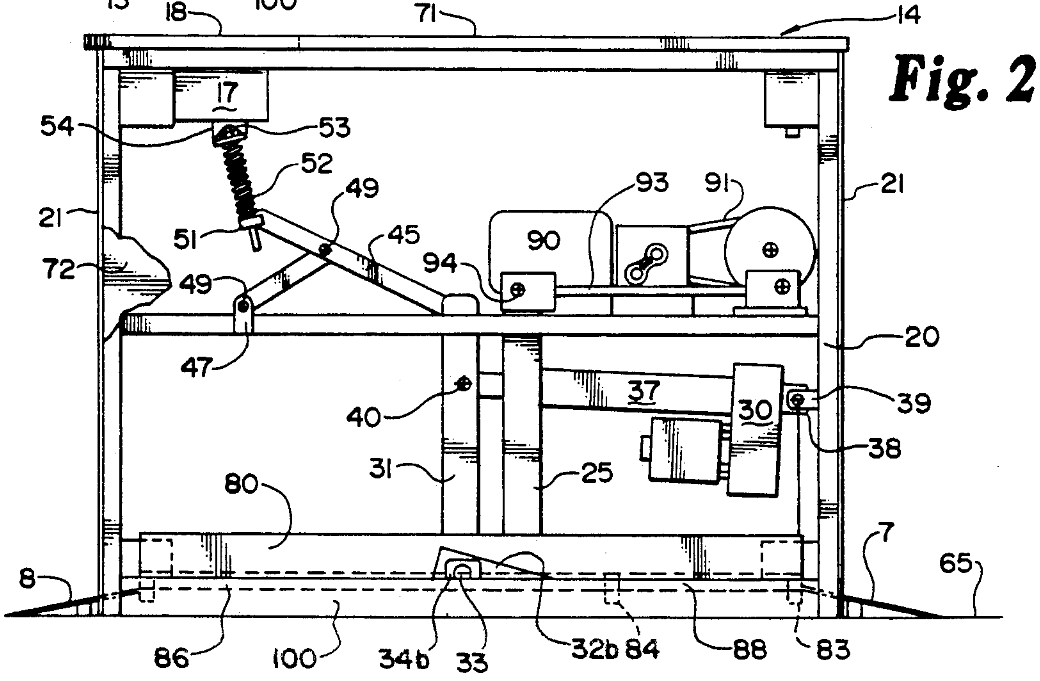
FIG. 2 is a side elevation, with certain parts removed for clarity, showing the actuator mechanism used in the present invention and its linkage to the support platform, with the support platform in a lowered, loading position.
Figure 6:
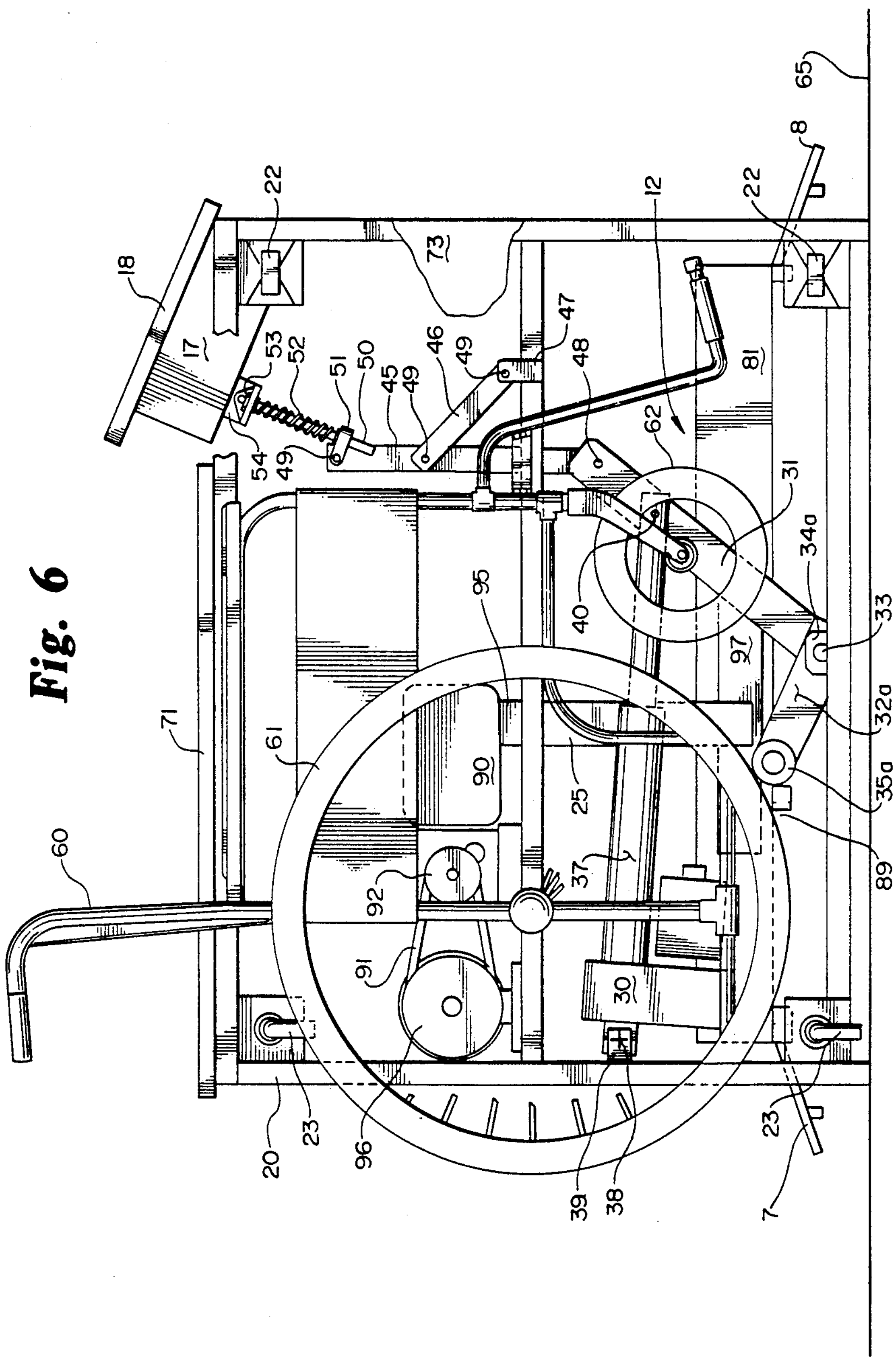
FIG. 6 is a side elevation showing the actuator mechanism used in the present invention and its linkage to the support platform, with the support platform in a raised position and a wheel chair shown in phantom lines.

FIG. 2 shows the rocking platform 12 in its lowered, loading position; FIG. 6 is the comparable view from the opposite side with the rocking platform 12 in its raised or rocking position. As will be described in greater detail below, a wheel chair ascends to the rocking platform 12 when it is in its lowered, loading position. Rocking occurs only after the rocking platform 12 has been lifted to its raised or rocking position.

Entrance ramp 7 is connected to wheel holding frame member 83 and slopes up to the level of wheel holding frame member 83 in its lowered position. Exit ramp 8 is connected to front connection member 85 and similarly slopes up to the level of front connection member 85 in its lowered position. Both ramps 7, 8 are made of molded plastic of sufficient rigidity to support a wheel chair. But the plastic material is also sufficiently flexible that it flexes when a toe or hand is inadvertently placed under a ramp edge.

Filler panel 88 is connected to the base frame 13. Significantly, it is connected between base frame outer rail 100 and the frame 20 of the actuator console 14 and is not connected to the wheel holding frame members 83, 84.

The present invention has two separate actuation systems. One lifts the rocking platform assembly 12 above the floor 65 to a position at which it can execute a rocking motion and lowers it again. The other causes the rocking platform assembly 12 to rock back and forth with a frequency and amplitude selected by the user.

Figure 3:
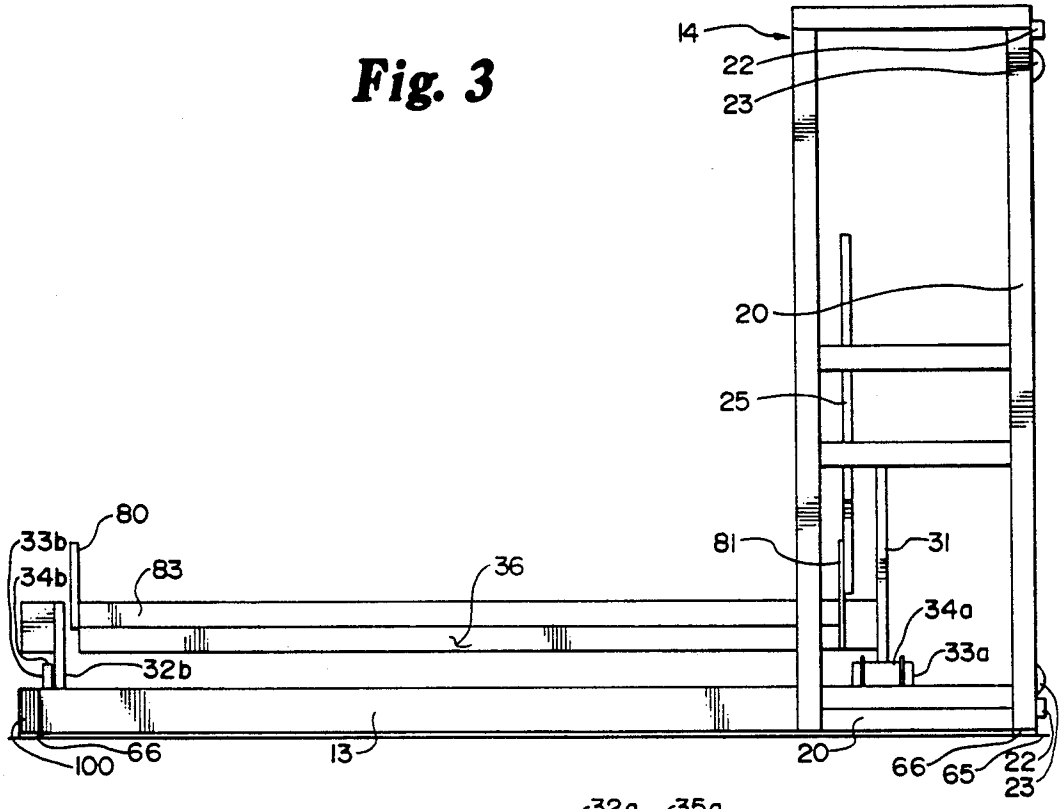
FIG. 3 is an end view showing the invention in rocking position, i.e., with the support platform raised.
Figure 4:
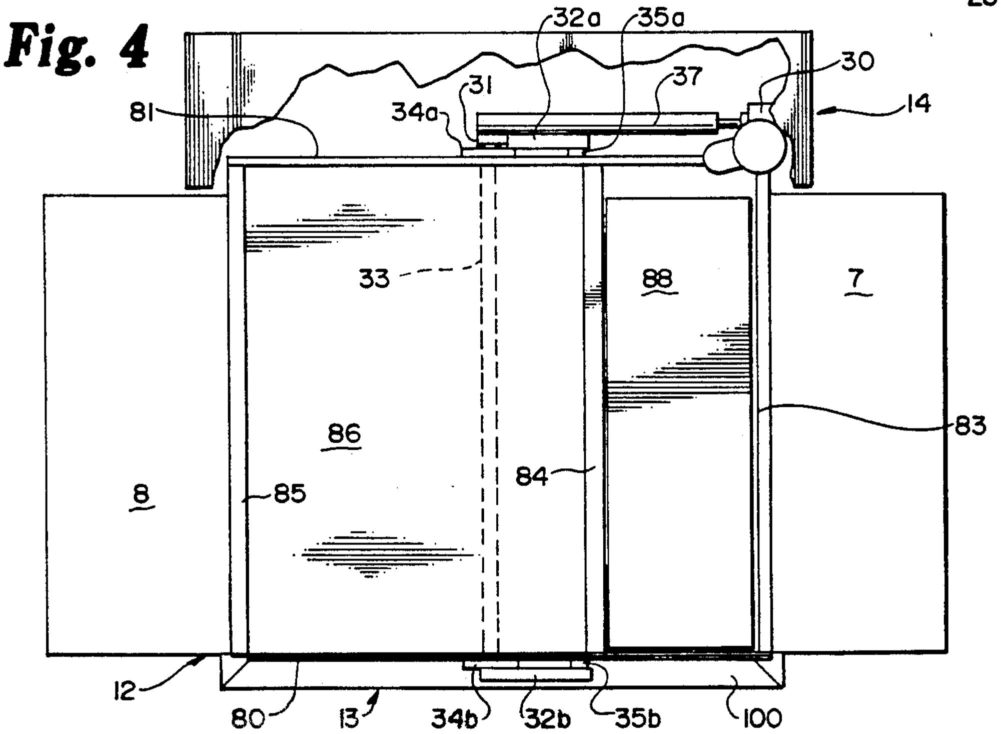
FIG. 4 is a plan view, with certain parts removed for clarity, showing the lifting portion of the actuator mechanism.
Figure 5:
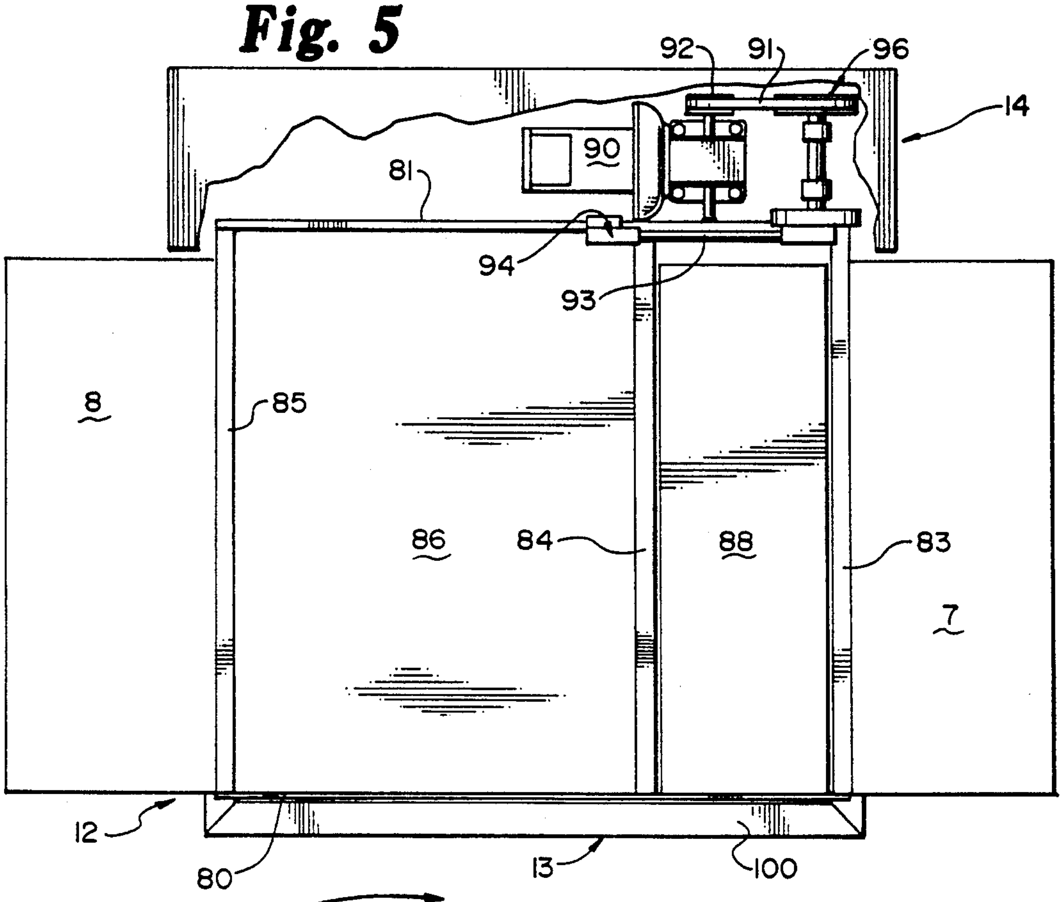
FIG. 5 is a plan view, with certain parts removed for clarity, showing the rocking portion of the actuator mechanism.

The actuation system to lift the rocking platform assembly 12 above the floor is best seen in FIGS. 2–4. It is primarily contained within the console 14, which has a generally rectangular box frame 20 with various horizontal and vertical support members, covered by end panels 21, to panel 71, entertainment housing to 18 (FIG. 2) and inner and outer major side panels 72, 73. In the preferred embodiment, the lifting means is an electromechanical linear actuator 30 that drives a "piston" 37 to extend and retract (e.g., a Model 4Z845A from Dayton Electric Manufacturing Co. of Chicago). The fixed end of actuator 30 is attached to the console frame 20 by bolt 38 at bracket 39. The moving end of "piston" 37 is pivotally connected by a bolt 40 near the upper end of a lifting lever 31. The lifting lever 31 pivots around a pivot shaft 33, mounted in a bearing block **34*a* connected at the lower end of the lifting arm 31, opposite the bolt 40. The pivot axis 33 extends under the rocking platform assembly 12. Similarly, the opposite end of pivot shaft 33 is mounted in bearing block 34*b* on the opposite side of the rocking platform 12, at the outer rail 100 of the base frame 13. A pitman arm 32*a* is rigidly connected to the lifting lever 31 and pivots with the lifting lever 31. At the moving end of the pitman arm 32*a* opposite its connection to the lifting lever 31, the pitman arm 32*a* is pivotally connected to rail 81 at pivot bearing 35*a*. Another pitman arm 32*b* is rigidly connected to the pivot shaft 33 adjacent the bearing block 34*b*, at the end of shaft 33 opposite pitman arm 32*a*. The moving end of the pitman arm 32*b* is pivotally connected to the rail 80 at pivot bearing 35*b*, axially aligned with pivot bearing 35*a***.

The actuator system for lifting the rocking platform assembly 12 also serves to raise and lower the entertainment module 16, which is contained in entertainment module housing 17 and covered by housing top 18. A lifter link 45 is connected to one end of the lifting lever 31 at a shoulder bolt 48 and extends upward to connect to a spring guide 51 fastened at bolt 49. The spring guide 51 holds one end of a spring 52 that encircles a push rod 50. The uppermost end of the push rod 50 is adjustably connected by nut 53 at adjustment bracket 54 extending from the bottom of the entertainment module housing 17. A leveler link 46 is connected by bolts 49 (one at either end) between the lifter link 45 and leveler link bracket 47 attached to console frame 20.

The actuator system for rocking motion is powered by a DC electric motor 90 (e.g., a ninety volt, one-fourth h.p., DC permanent magnet motor from Lesson Electric Corp.) that delivers rotary motion to a built-in reducing gear box (preferably a 60 to 1 reduction) that, in turn, delivers rotary motion to a pulley 92 connected by a v-belt 91 to a pitman assembly 96. The pitman assembly 96 delivers motion to a reciprocating connecting rod 93 connected by a pivot pin 94 to the upper end of rocker arm 25. The lower end of rocker arm 25 is fixed to a connection plate 97 (FIG. 6) attached to rail 81. The use of the pulley 92 and v-belt 91 helps to reduce the amount of vibration from the reducing gear box that enters the rocking support platform assembly 12.

Additional features of the actuator console 14 visible in FIGS. 3 and 6 are a pair of transport wheels 22, 22 one at the top of the right-hand side (as seen in FIG. 6) of the console 14 and one at the bottom. At the left-hand side (as seen in FIG. 6) of the console 14, is a pair of casters 23, 23, one at the top and one at the bottom. As can be seen, these wheels and casters 22, 22, 23, 23 permit the entire wheel chair rocker unit 10 to be oriented so that the outer major side panel 73 is lowered to lie adjacent the floor 65 and to be transported on the wheels and casters 22, 22, 23, 23.

Also visible in FIG. 3 are thread-mounted leveling pads 66. One of these is located in each the outer corners of the console 14 and base frame 13. They permit thee corners to be raised and lowered a small distance to compensate for floor irregularities that might cause the rocking support assembly 12 to deviate from horizontal.

In operation, the invention functions as follows, as best seen in FIGS. 2 through 6. The wheel chair rocker 10 is transported to the desired place of use on the wheels and casters 22, 22, 23, 23. At the place of use it is rotated ninety degrees from its transport position, so that the rocker platform assembly 12 lies horizontal. Any deviations from horizontal are compensated by adjustment of the leveling pads 66. At this point the support panel 86 is in its lowered position and is in substantially the same plane as the filler panel 88 (as shown in FIGS. 1 and 2). The device is ready to receive the load of a standard wheel chair 60 with rear wheels 61 and smaller front wheels 62 (see FIG. 6).

The wheel chair-confined person rolls up the entrance ramp 7 and positions the rear wheels 61 so that their point of contact with the device is on the filler panel 88 intermediate the wheel holding frame members 83, 84. (To guide a user who cannot see the position of the rear wheels 61, a shallow groove (not shown) could be placed in the filler panel 88 that could be felt as the wheel chair 60 rolls into it.) Because the rocker platform assembly 12 is only slightly raised above the floor 65, the ascent of the ramp 7 can be managed by many wheel chair-confined individuals alone and without great difficulty. Preferably, the wheel chair brake (not shown) is set to hold the wheel chair 60 in this position.

Using the control panel 4, the user activates the actuator 30, causing the "piston" 37 to extend, the lever 31 to rotate clockwise (as seen in FIG. 6) through a small arc and the pitman arms 32*a*, 32*b* to lift the rocker platform assembly 12 a small distance (six to eight inches) above the floor 65. It should be noted that the rail 81 acts like a floating shield, because it is attached to the support platform 86 and moves with the support platform 86 inside the actuator console 14 adjacent the inner major side panel 72. This allows the support platform 86 to be lowered without a gap opening above the support platform 86 and leading into the actuator mechanism in console 14.

Secure holding of the rear wheels 61 of the wheel chair 60 is achieved in the present invention, because the filler panel 88 stays adjacent the floor 65 while the support platform 86 and the wheel chair holding members 83,84 are lifted. Thus, the space beteen the wheel chair holding members 83,84 becomes a wheel-securing opening 89. A portion of the arc of the rear wheels 61 extends below the plane of the support panel 86. In the preferred embodiment, the lowest point of the rear wheels 61 is about two inches below the plane of the top surface of the support panel 86 and an arc of about twenty degrees is captured between the wheel chair holding members 83,84. This provides relatively secure holding of the rear wheels 61, even when the rocking platform assembly 12 tilts for rocking.

Figure 8:
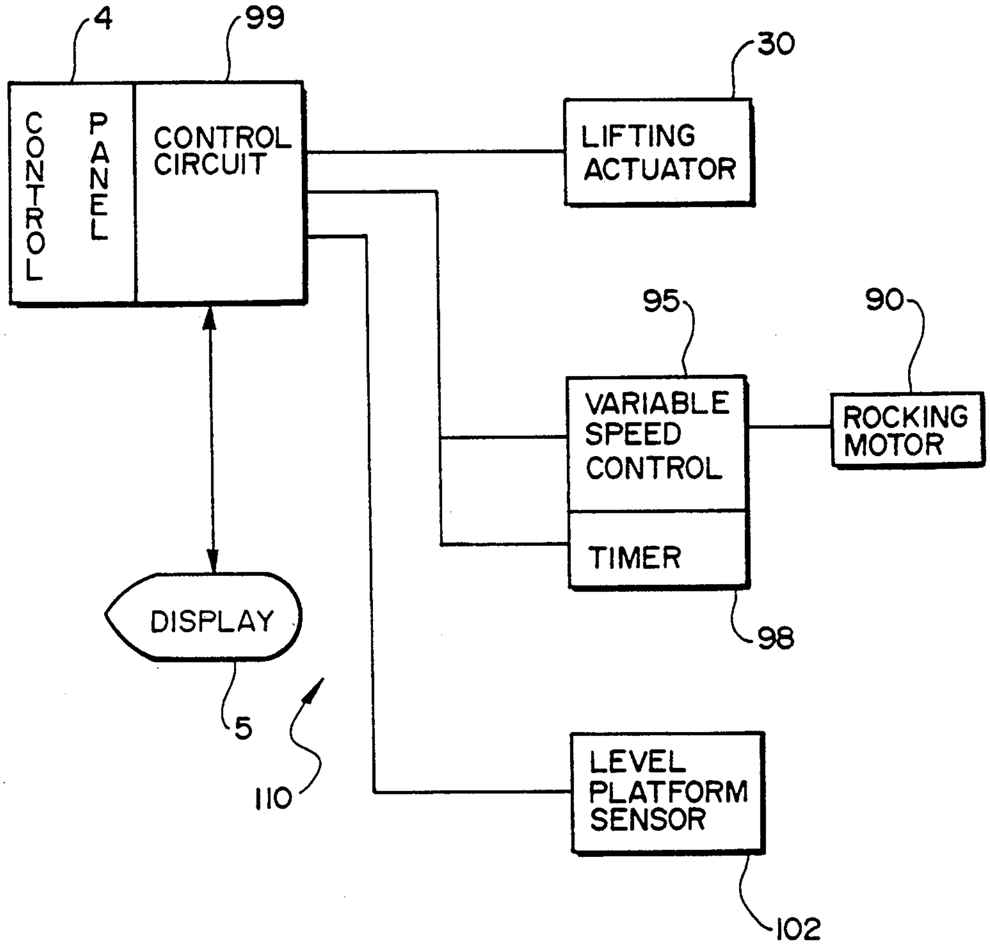
FIG. 8 is a block diagram showing the basic components of the control system for the present invention.

In this elevated position, the user can now actuate the motor 90 of the rocking mechanism, which has several special control features. These are best understood by reference to FIG. 8, which shows a block diagram of the basic components of the control system 110 for the present invention. In control circuit 99, the control for the motor 90 is linked with the lifting mechanism so that the motor 90 cannot be activated without the prior raising of the rocker platform assembly 12. THe motor 90 also has a variable speed control 95, controllable at control panel 4, that allows essentially infinite adjustment of motor speed and, thus, rocking frequency. This facility, together with internally adjustable acceleration and deceleration speed rates allows gradual speed ramp-up over a brief, timed period when rocking commences and gradual speed ramp-down when the user turns off the rocking motion. This prevents a potentially uncomfortable abrupt start or stop of rocking motion.

The control system 110 also includes means for ensuring that the support panel 86 is level before the rocking platform assembly 12 is lowered. This means includes a level platform sensor 102 which may sense the actual position of the top of rail 81 or the position of the connecting rod 93 or some other part of the rocking mechanism and a timer 98. Thus, when the user selects rocking "off" at control panel 4, the power to the motor 90 is not removed and actual rocking does not cease until both speed ramp-down and leveling have occurred under control of sensor 102 and timer 98 of the control system 110. At that point the user can select lowering of the rocking platform assembly 12 byu reversing the motion of lifting actuator 30.

In a preferred embodiment of the control system 110, electricity is supplied to the control system by a 110 volts AC 16 amp power cord. A six amp fuse provides overcurrent and short circuit protection for all electrical components. From the fuse, power is routed to an up/down control switch for the rocking platform assembly 12, then through adjustable rocking platform limit switches to the linear actuator 30. With the rocking platform assembly 12 in a fully raised position, electricity is diverted via an up limit switch to an on/off power switch, a platform position limit switch (sensor) and a time delay relay used to control the platform rocking motion and ensure the platform returns to a level position when it is turned off. In the preferred embodiment, the motor 90 has, in addition to the features mentioned above, a current limit control and minimum and maximum speed settings.

Figure 7:
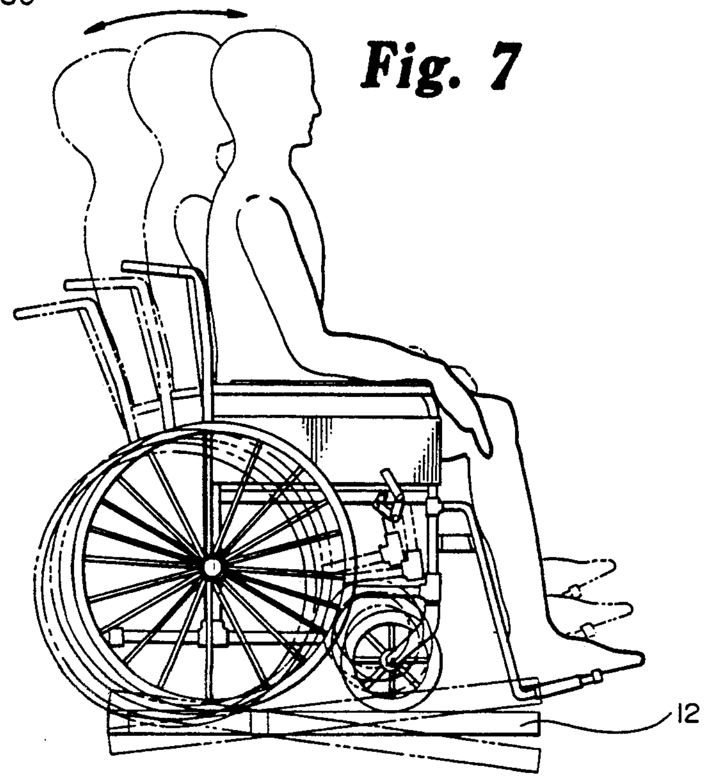
FIG. 7 is a schematic side view of the support platform of the present invention showing the range of rocking motion available.

The available range of rocking motion is displayed in FIG. 7, where it can be seen that the angle of rocking available is limited by the height of the rocking platform assembly 12. However, it has been found that only a small range of angular motion, e.g. two to 15 degrees (total arc) is all that most people desire. From FIGS. 4 and 7, it can be seen that the prior axis for rocking passes through axially aligned pivot bearings 35*a*, 35*b*. In the present invention, the available angle of rocking can be adjusted, if desired, by changing the position of the connecting rod 93 relative to the rotational axis of the pulley assembly 92. The ramps 7, 8 move with the rocking platform assembly 12 and in their raised position (FIG. 6) act as flexible guards, to prevent persons from placing a toe or hand far enough under the rocking platform assembly 12 to be injured by the non-flexible members 83 or 85.

The user can adjust the rocking frequency to the desired level and can also activate the entertainment module 16. This may be a radio, a tape player, a compact disc player or a small screen television, or any combination of the preceding. When the user no longer wishes to rock, the user uses the control panel to turn off rocking and lower the rocker platform assembly 12. Once it is lowered, the user may descend, using the exit ramp 8 and simply rolling forward. As the rocker platform assembly 12 is lowered, the filler panel 88 comes in contact with the rear wheels 61, so that these are no longer captured between the wheel chair holding members 83, 84 when the fully lowered position is reached.

While the wheel chair rocker 10 of the present invention is in use, the display panel 5 shows the status of the device: whether the device is in the raised or lowered position, whether the rocking mechanism is activated and the frequency of rocking selected.

In sum, the present invention is easy to ascend, descend and use. It provides secure holding of the wheel chair 60 during rocking and permits the user to select a comfortable rocking speed. Although the wheel holding opening is shown as a single rectangular opening in the shape of filler panel 88, variations are possible. For example, there could be two slots with two fillers, one located adjacent each of the rails 80, 81 of the rocking platform assembly 12. Also, the wheel holding opening could be positioned so as to hold the front wheels 62, rather than the rear wheels 61. Another variation involves the relative motion of support platform 86 and filler platform 88. It can be seen that by raising the height of support platform 86 and making it stationary, filler platform 88 could be made downwardly movable. Lowering filler platform 88 below a stationary support platform 86 would allow the rear wheels 61 to be captured in the same manner as raising support platform 86 while filler platform 88 remains stationary.

It can further be seen that the present invention can be adapted to nonstandard wheel chairs, e.g., wheel chairs having small rear wheels, by simply changing the shape and/or size of the wheel-securing opening 89 and filler platform 88, so that the opening 89 captures and securely holds the wheels when the filler platform 88 moves below the plane of the support platform 86. Moreover, it can be seen that with similar modifications the present invention could be used to provide rocking motion to other wheeled devices, such as baby carriages.

Although the description of the preferred embodiment has been presented, it is contemplated that various changes could be made without deviating from the spirit of the present invention. Accordingly, it is intended that the scope of the present invention be dictated by the appended claims rather than by the description of the preferred embodiment.

What is claimed as new and desired to be protected by Letters Patent is:

1. An apparatus for supporting a wheel chair for rocking comprising:

a support platform with at least one wheel-securing opening for holding at least one wheel of said wheel chair;

a filler platform adapted to fit removably in the wheel-securing opening substantially in the plane of said support platform; and means for moving the support platform and filler platform relative to each other so that the support platform moves between a rocking position with the filler platform moved from the wheel-securing opening and at least one wheel held in the wheel securing opening and a loading position in which the filler platform fits in the wheel-securing opening and supports said at least one wheel.

2. Apparatus as recited in claim 1 wherein the filler platform is stationary and the means for moving the support platform and filler platform relative to each other comprises means for raising the support platform to a rocking position above the filler platform and lowering the support platform into a loading position in which the filler platform fits in the wheel-securing opening.

3. Apparatus as recited in claim 1 further comprising means for rocking the support platform about a horizontal axis when it is in its rocking position.

4. Apparatus as recited in claim 3 wherein the means for rocking comprises;

a prime mover for delivering rotational motion;

a rocker arm connected to the support platform;

reciprocating means connected to said prime mover for delivering reciprocal motion to the rocker arm; and isolation means connected between the prime mover and the reciprocating means for isolating vibration from the prime mover.

5. Apparatus as recited in claim 4 wherein the isolation means is a pulley and v-belt connected between the prime mover and the reciprocating means.

6. Apparatus as recited in claim 3 wherein the means for rocking the support platform comprises means for increasing the frequency of the rocking motion gradually.

7. Apparatus as recited in claim 3 wherein the means for rocking the support platform comprises means for adjusting the frequency of the rocking motion.

8. Apparatus as recited in claim 1 wherein the wheel-securing opening is a rectangular opening that extends across the support platform.

9. Apparatus as recited in claim 8 further comprising a base frame for supporting the support platform and filler platform on a substrate and wherein the filler platform is fixedly attached to the base frame.

10. Apparatus as recited in claim 1 wherein the first ramp is used to ascend to the support platform and further comprising a second ramp used to descend from the support platform.

11. A method for supporting and securing a wheelchair for rocking comprising:

providing a support platform with at least one wheel-securing opening and a filler platform removably fitting in the wheel-securing opening;

positioning the wheelchair on the support platform with at least one wheel supported on the filler platform; and moving the support platform and filler platform relative to each other between a loading position in which the filler platform fits in the wheel-securing opening and a rocking position with the filler platform moved from the wheel-securing opening and said at least one wheel held in the wheel-securing opening.

12. The method of claim 11 wherein the step of moving the support platform and filler platform relative to each other comprises raising the support platform to a rocking position above the filler platform.

13. The method of claim 11 further comprising the step of rocking the support platform about a horizontal axis when it is in its rocking position.

14. The method of claim 13 wherein the step of rocking the support platform comprises gradually ramping-up the rocking speed when rocking commences.

15. The method of claim 14 wherein the step of rocking the support platform comprises gradually ramping-down the rocking speed when rocking motion is turned off.

* * * * *